United States Patent
Ito

(10) Patent No.: US 9,721,410 B2
(45) Date of Patent: Aug. 1, 2017

(54) AUTHENTICATION SYSTEM, AUTHENTICATION APPARATUS, AND AUTHENTICATION METHOD

(71) Applicant: FUJITSU LIMITED, Kawasaki-shi, Kanagawa (JP)

(72) Inventor: Kimikazu Ito, Ebina (JP)

(73) Assignee: FUJITSU LIMITED, Kawasaki (JP)

(*) Notice: Subject to any disclaimer, the term of this patent is extended or adjusted under 35 U.S.C. 154(b) by 50 days.

(21) Appl. No.: 14/644,918

(22) Filed: Mar. 11, 2015

(65) Prior Publication Data

US 2015/0279135 A1  Oct. 1, 2015

(30) Foreign Application Priority Data

Mar. 31, 2014  (JP) .................................. 2014-072982

(51) Int. Cl.
*G06K 9/62* (2006.01)
*G06K 9/00* (2006.01)
(Continued)

(52) U.S. Cl.
CPC ..... *G07C 9/00158* (2013.01); *G06K 9/00087* (2013.01); *G07C 9/00166* (2013.01)

(58) Field of Classification Search
CPC .. G06K 9/62; G06K 9/00; G06K 9/68; H04K 1/00; H04L 9/00; G05B 19/00; G06F 7/00
(Continued)

(56) References Cited

U.S. PATENT DOCUMENTS 5,870,723 A * 2/1999 Pare, Jr. .................. G06F 21/32
705/39
7,424,618 B2 * 9/2008 Roy .................. G06K 9/00006
340/5.8
(Continued)

FOREIGN PATENT DOCUMENTS

| JP | 2001-140519 | 5/2001 |
| JP | 2004-005532 | 1/2004 |
| JP | 2008/040763 | 2/2008 |

OTHER PUBLICATIONS

Extended European Search Report dated Aug. 24, 2015 in corresponding European Patent Application No. 15159179.9.
(Continued)

*Primary Examiner* — Nam V Nguyen
(74) *Attorney, Agent, or Firm* — Staas & Halsey LLP

(57) ABSTRACT

An authentication system includes a plurality of authentication apparatuses, each of which includes first biological information of a same set of users; a crosschecking unit for crosschecking input biological information with a part of the first biological information; a transmitter for assigning second biological information included in the first biological information other than the part of the first biological information to the other authentication apparatuses without assigning same information in the second biological information to other authentication apparatuses, and to request the other authentication apparatuses to crosscheck the input biological information with the assigned second biological information; and a receiver for receiving, from the one or more other authentication apparatuses, one or more results of crosschecking the input biological information with the assigned second biological information by the one or more other authentication apparatuses in response to the requesting.

10 Claims, 15 Drawing Sheets

(51) Int. Cl.
G06K 9/68 (2006.01)
H04K 1/00 (2006.01)
H04L 9/00 (2006.01)
G07C 9/00 (2006.01)

(58) Field of Classification Search
USPC .......... 340/5.8, 5.82, 5.7; 713/186; 382/115, 382/124, 125, 126; 705/5
See application file for complete search history.

(56) References Cited

U.S. PATENT DOCUMENTS

| | | | | |
|---|---|---|---|---|
| 7,631,193 B1* | 12/2009 | Hoffman | ............... | G06F 21/32 |
| | | | | 382/115 |
| 7,773,779 B2* | 8/2010 | Shalev | ............... | G06F 21/32 |
| | | | | 235/380 |
| 8,064,646 B2* | 11/2011 | Hagino | ............... | G06F 21/32 |
| | | | | 340/5.2 |
| 8,763,070 B2* | 6/2014 | Cozart | ............... | G06F 21/604 |
| | | | | 726/1 |
| 9,076,027 B2* | 7/2015 | Miura | ............... | G06K 9/00087 |
| 9,189,788 B1* | 11/2015 | Robinson | ......... | G06Q 20/40145 |
| 9,596,561 B2* | 3/2017 | Heo | ............... | H04W 4/008 |
| 2002/0133725 A1 | 9/2002 | Roy et al. | | |
| 2004/0258281 A1 | 12/2004 | Delgrosso et al. | | |
| 2006/0069923 A1 | 3/2006 | Ito et al. | | |
| 2008/0031496 A1 | 2/2008 | Takagi | | |
| 2014/0241593 A1* | 8/2014 | Koseki | ............... | G06K 9/00221 |
| | | | | 382/118 |
| 2016/0005058 A1* | 1/2016 | Sagara | ............... | G06Q 30/0241 |
| | | | | 705/7.32 |

OTHER PUBLICATIONS

Wikipedia, "Load balancing (computing)", Mar. 2009, pp. 1-4, Retrieved from the Internet Apr. 21, 2010 <en.wikipedia.org/w/index.php?title=Loadbalancing-(computing)&oldid=277843126>.
Wikipedia, "Data parallelism", Aug. 2013, pp. 1-3, Retrieved from the Internet Aug. 5, 2015 <en.wikipedia.org/w/index.php?title=Dataparallelism&oldid=569298327>.

* cited by examiner

FIG. 6A

| USER ID | BIOLOGICAL DATA |
|---|---|
| 0001 | 🖐 |
| 0002 | 🖐 |
| ... | ... |
| ... | ... |
| 0399 | 🖐 |
| 0400 | 🖐 |

FIG. 6B

| CLASSIFICATION NO. | USER IDs TARGETED FOR CROSSCHECKING | CROSSCHECKING REQUESTING OR REQUESTED APPARATUS ID |
|---|---|---|
| a | 0001 TO 0100 | A01 (REQUESTING APPARATUS) |
| b | 0101 TO 0200 | A02 (APPARATUS LOCATED ON OPPOSITE SIDE WITH RESPECT TO DOOR) |
| c | 0201 TO 0300 | A19→A03 |
| d | 0301 TO 0400 | A20 |

FIG. 6C

| APPARATUS ID | USAGE FREQUENCY IN TIME ZONE (RANK FOR EACH DAY) ||||||||
| | 6:00 TO 12:00 || 12:00 TO 18:00 || 18:00 TO 24:00 || 24:00 TO 6:00 ||
| | AVERAGE NUMBER OF TIMES OF CROSSCHECKING IN TIME ZONE IN ONE DAY | RANK | AVERAGE NUMBER OF TIMES OF CROSSCHECKING IN TIME ZONE IN ONE DAY | RANK | AVERAGE NUMBER OF TIMES OF CROSSCHECKING IN TIME ZONE IN ONE DAY | RANK | AVERAGE NUMBER OF TIMES OF CROSSCHECKING IN TIME ZONE IN ONE DAY | RANK |
|---|---|---|---|---|---|---|---|---|
| A01 | 510 | 1 | 535 | 1 | 21 | 15 | 0 | 20 |
| A02 | 432 | 2 | 434 | 2 | 30 | 14 | 0 | 20 |
| A03 | 151 | 18 | 170 | 17 | 41 | 12 | 5 | 12 |
| ... | ... | ... | ... | ... | ... | ... | ... | ... |
| A19 | 99 | 20 | 150 | 19 | 82 | 1 | 8 | 2 |
| A20 | 103 | 19 | 125 | 20 | 75 | 2 | 10 | 1 |

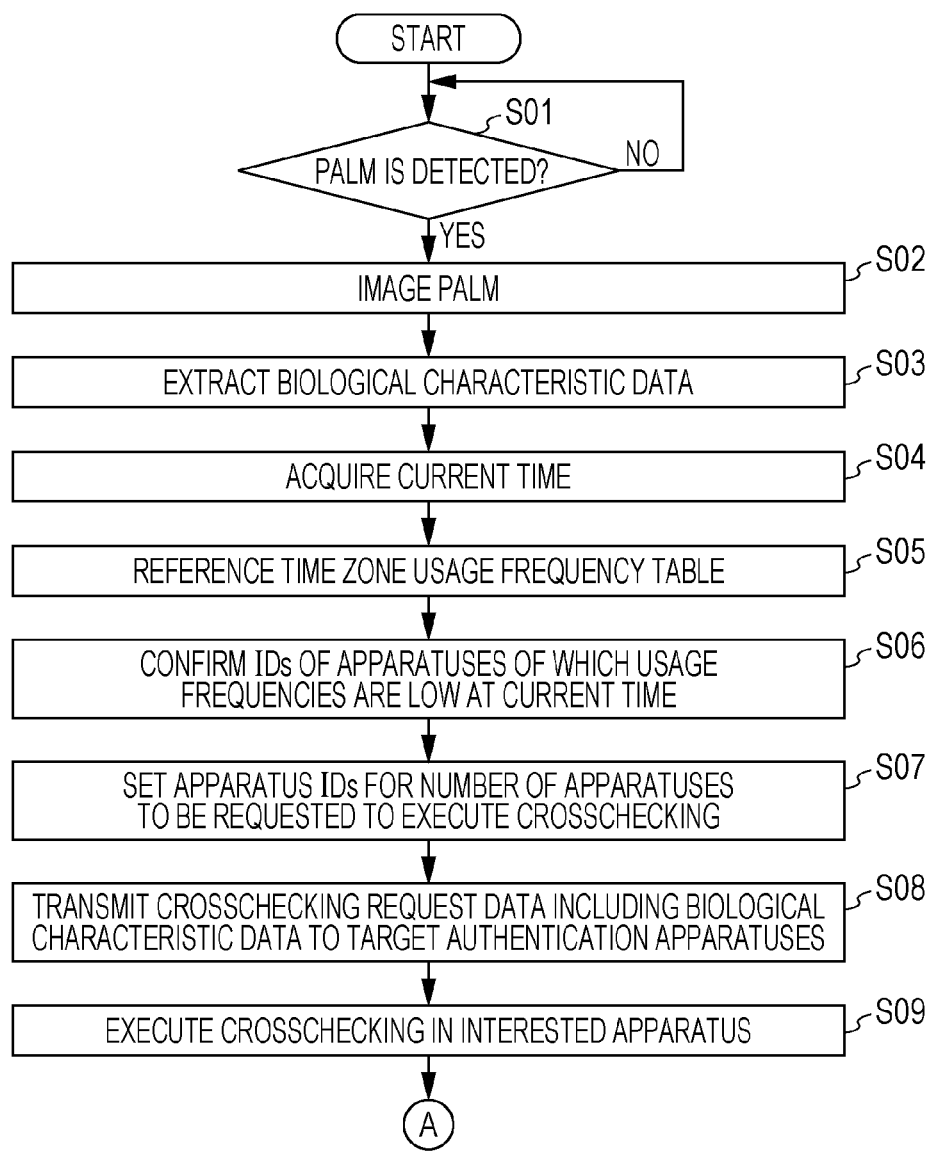

FIG. 8A

| FUNCTION CODE | DATA LENGTH | REQUESTING APPARATUS ID | CLASSIFICATION NO. | REQUESTED APPARATUS ID | BIOLOGICAL DATA |
|---|---|---|---|---|---|
| 20H | XXXXH | 0A01H | 0DH | 0A20H | FFH,13H,15H ····· FEH |

FIG. 8B

| FUNCTION CODE | DATA LENGTH | REQUESTING APPARATUS ID | CLASSIFICATION NO. | CROSSCHECKING SUCCESS OR FAILURE FLAG | USER ID | AUTHENTICATION RATE |
|---|---|---|---|---|---|---|
| 21H | XXXXH | 0A20H | 0DH | 01H | 0016 | 95 (%) |

FIG. 10

| | USAGE FREQUENCY IN TIME ZONE (RANK FOR DAY) | | | | | | | |
|---|---|---|---|---|---|---|---|---|
| | 6:00 TO 12:00 | | 12:00 TO 18:00 | | 18:00 TO 24:00 | | 24:00 TO 6:00 | |
| APPARATUS ID | AVERAGE NUMBER OF TIMES OF CROSSCHECKING IN TIME ZONE IN ONE DAY | RANK | AVERAGE NUMBER OF TIMES OF CROSSCHECKING IN TIME ZONE IN ONE DAY | RANK | AVERAGE NUMBER OF TIMES OF CROSSCHECKING IN TIME ZONE IN ONE DAY | RANK | AVERAGE NUMBER OF TIMES OF CROSSCHECKING IN TIME ZONE IN ONE DAY | RANK |
| A01 | 510 | 1 | 535 | 1 | 21 | 15 | 0 | 20 |
| A02 | 432 | 2 | 434 | 2 | 30 | 14 | 0 | 20 |
| A03 | 151 | 18 | 170 | 17 | 41 | 12 | 5 | 12 |
| ... | | ... | | ... | | ... | | ... |
| A19 | 99 | 20 | 150 | 19 | 82 | 1 | 8 | 2 |
| A20 | 103 | 19 | 125 | 20 | 75 | 2 | 10 | 1 |

⬇ CALCULATE AVERAGES OF RANKS FOR EACH DAY (MOST RECENT PERIOD OF MONTH)

| | USAGE FREQUENCY IN TIME ZONE (AVERAGE RANK IN MOST RECENT PERIOD OF MONTH) | | | |
|---|---|---|---|---|
| | 6:00 TO 12:00 | 12:00 TO 18:00 | 18:00 TO 24:00 | 24:00 TO 6:00 |
| APPARATUS ID | RANK | RANK | RANK | RANK |
| A01 | 1 | 2 | 16 | 20 |
| A02 | 2 | 1 | 15 | 19 |
| A03 | 18 | 18 | 9 | 10 |
| ... | ... | ... | ... | ... |
| A19 | 20 | 20 | 1 | 2 |
| A20 | 19 | 19 | 2 | 1 |

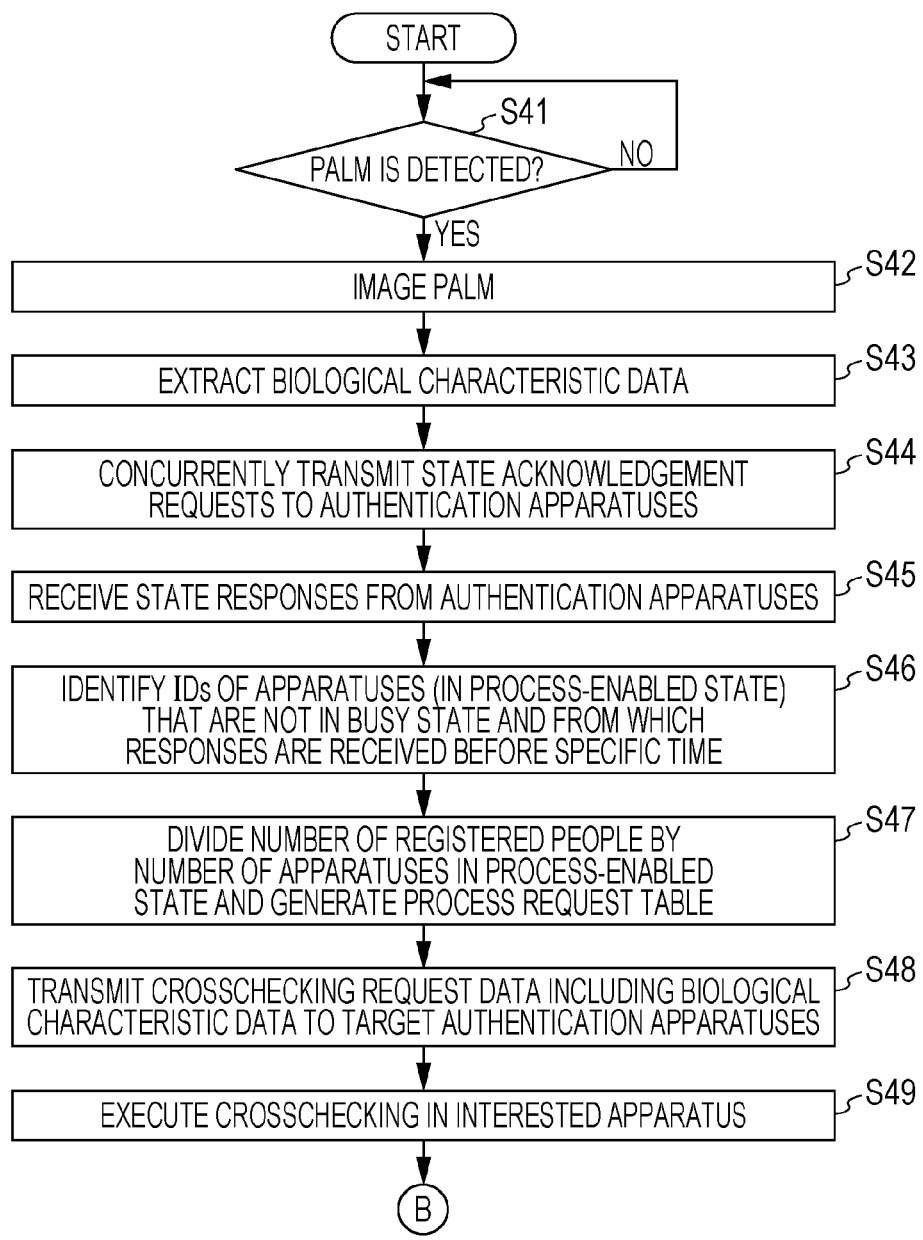

FIG. 12A

| FUNCTION CODE | DATA LENGTH | REQUESTING APPARATUS ID | CURRENT TIME |
|---|---|---|---|
| 30H | XXXXH | 0A01H | 10:15:25 85 |

FIG. 12B

| FUNCTION CODE | DATA LENGTH | RESPONDING APPARATUS ID | RESPONSE TIME | STATE |
|---|---|---|---|---|
| 31H | XXXXH | 0A20H | 10:15:26 01 | FFH (BUSY) |

FIG. 13

| CLASSIFIED USER IDs | APPARATUS ID |
|---|---|
| 0001 TO 0044 | A02 |
| 0045 TO 0088 | A05 |
| 0089 TO 0132 | A09 |
| 0133 TO 0176 | A10 |
| 0177 TO 0220 | A12 |
| 0221 TO 0264 | A20 |
| 0265 TO 0308 | A25 |
| 0309 TO 0352 | A26 |
| 0353 TO 0396 | A33 |
| 0397 TO 0400 | A01 (INTERESTED APPARATUS) |

AUTHENTICATION SYSTEM, AUTHENTICATION APPARATUS, AND AUTHENTICATION METHOD

CROSS-REFERENCE TO RELATED APPLICATION

This application is based upon and claims the benefit of priority of the prior Japanese Patent Application No. 2014-072982, filed on Mar. 31, 2014, the entire contents of which are incorporated herein by reference.

FIELD

The embodiment discussed herein is related to an authentication system, an authentication apparatus, and an authentication method.

BACKGROUND

There is an authentication system that compares and crosschecks biological information registered in an authentication apparatus with biological information read from an authentication apparatus and manages entries and leaving of people in and from a room when a person tries to enter or leave in or from the room. For the authentication, the user inputs a biological information item and an ID number assigned to the user. Then, the authentication system extracts registered biological information associated with the input ID number and compares the extracted single biological information with the input single biological information so as to execute the authentication.

Japanese Laid-open Patent Publication Nos. 2001-140519, 2004-5532, and 2008-40763 are examples of related art.

SUMMARY

According to an aspect of the invention, an authentication system includes a plurality of authentication apparatuses, each of the plurality of authentication apparatuses including first biological information of a same set of users in a storage unit, wherein the each of the plurality of authentication apparatuses includes a crosschecking unit configured to crosscheck, when input biological information to be subjected to authentication is input, the input biological information with a part of the first biological information; a transmitter configured to assign second biological information that is included in the first biological information other than the part of the first biological information to one or more of the other authentication apparatuses without assigning same information in the second biological information to one or more other authentication apparatuses among the plurality of authentication apparatuses, and to request the one or more other authentication apparatuses to crosscheck the input biological information with the assigned second biological information; and a receiver configured to receive, from the one or more other authentication apparatuses, one or more results of crosschecking the input biological information with the assigned second biological information by the one or more other authentication apparatuses in response to the requesting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A, 6B, and 6C are diagrams illustrating examples of data of various types according to the first example;

FIGS. 7A and 7B are a flowchart of an example of the authentication process according to the first example;

FIGS. 8A and 8B are diagrams illustrating an example of data to be used upon a request for crosschecking;

FIG. 10 is a diagram illustrating the monthly time zone usage frequency table;

FIGS. 11A and 11B are a flowchart of an example of an authentication process according to a second example;

FIGS. 12A and 12B are diagrams illustrating an example of a state acknowledgement request and an example of a response to the state acknowledgement request according to the second example; and FIG. 13 is a diagram illustrating an example of a process request table according to the second example.

DESCRIPTION OF EMBODIMENTS

However, in the related art, the user inputs the two items, the ID number and the biological information item, and an operation of inputting the two items is cumbersome. Thus, authentication only using biological information has been requested. When authentication is to be executed using only biological information, the authentication is executed by comparing input biological information with all registered biological information. When the number of registered people is large, it takes time to execute the authentication and an operation is difficult.

According to an aspect, it is desired the embodiment to reduce a time to execute authentication using biological information.

Hereinafter, an embodiment is described with reference to the accompanying drawings.

Example of Outline Configuration of Authentication System

Figure 1:
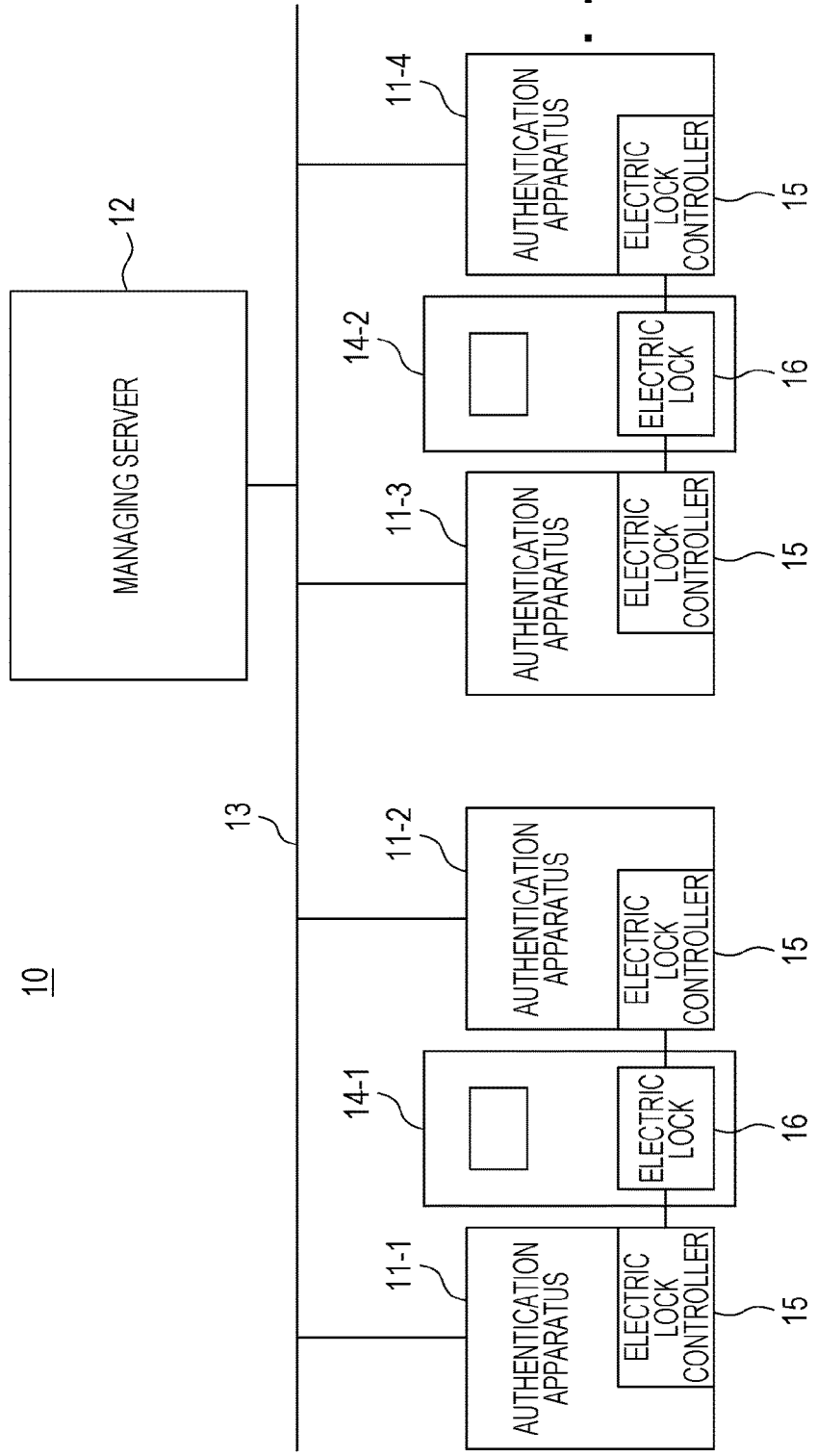
FIG. 1 is a diagram illustrating an example of an outline configuration of an authentication system.

FIG. 1 is a diagram illustrating an example of an outline configuration of an authentication system. An authentication system 10 illustrated in FIG. 1 includes one or more authentication apparatuses 11-1 to 11-n (hereinafter referred to as "authentication apparatuses 11" as appropriate) and a managing server 12. The authentication apparatuses 11 and the managing server 12 are coupled to each other through a communication network 13 so as to be able to transmit and receive data to and from each other through the communication network 13 that is typified by a local area network (LAN), the Internet, or the like. The communication network 13 may be a wired network, a wireless network, or a combination of wired and wireless networks.

The authentication system 10 illustrated in the example of FIG. 1 manages entries and leaving of users in and from a predetermined area (region) such as a facility, a building, or a room. Thus, the authentication apparatuses 11 are installed near entrance doors (for example, doors 14-1 to 14-4 or the like) to the predetermined area. Each pair of opposing authentication apparatuses 11 is provided for a respective door 14 so as to ensure that one of the pair is provided for entries in the predetermined area through the door 14 and the other of the pair is provided for leaving from the predetermined area through the door 14. In the example of FIG. 1, the authentication apparatus 11-2 is installed for an entrance through the door 14-1, the authentication apparatus 11-1 is installed for an exit through the door 14-1, and the door 14-1 is located between the authentication apparatuses 11-1 and 11-2. Similarly, the authentication apparatus 11-4 is installed for an entrance through the door 14-2, the authentication apparatus 11-3 is installed for an exit through the door 14-2, and the door 14-2 is located between the authentication apparatuses 11-3 and 11-4. The embodiment, however, is not limited to this. For example, authentication apparatuses 11 may not be installed on exit sides of the doors.

The authentication apparatuses 11 include respective electric lock controllers 15. The electric lock controllers 15 control, based on authentication results, opening and closing of electric locks 16 so as to open and close the doors 14 for entries and leaving in and from the predetermined area. Each of the authentication apparatuses 11 stores registered biological information (registered biological data), transmitted by the managing server 12 and to be crosschecked, of all registered people. When one of the authentication apparatuses 11 receives biological information to be subjected to authentication, the one of the authentication apparatus 11 crosschecks the received biological information to be subjected to the authentication with registered biological information included in one of classified ranges of the registered biological information, where the registered biological information is classified previously into the predetermined number of ranges. In addition, in order to crosscheck the received biological information to be subjected to the authentication with registered biological information included in the other of classified ranges of the registered biological information, the one of the authentication apparatuses 11 sends a request to each of the other authentication apparatuses 11 of which the number is the predetermined number of ranges minus one so that each of the other authentication apparatuses 11 crosschecks the received biological information to be subjected to authentication with the registered biological information included in corresponding one of the other of classified ranges which is identified by the request from the one of the authentication apparatuses 11. The each of the other authentication apparatuses 11 is selected also based on positional information and usage frequency information of a plurality of other authentication apparatuses 11. Each of the requested other authentication apparatuses 11 crosschecks the biological information to be subjected to the authentication with registered biological information included in the identified ranges and notifies the authentication apparatus 11 that has received the biological information to be subjected to the authentication of results of the crosschecking.

The aforementioned usage frequency information is the numbers of times when the other authentication apparatuses 11 execute crosschecking in predetermined time zones including a time when the authentication apparatus 11 receive the biological information to be subjected to the authentication. The usage frequency information, however, is not limited to this.

In addition, the interested authentication apparatus 11 executes the authentication based on results of the crosschecking executed by the interested authentication apparatus 11 and results of the crosschecking executed by the other requested authentication apparatuses 11. For example, when the crosschecking results represent that the crosschecking succeeds, the interested authentication apparatus 11 causes the electric lock controller 15 of the interested authentication apparatus 11 to open (unlock) an interested electric lock 16 installed at a door 14 and permits a user corresponding to the received biological information to pass through the door 14.

When a certain authentication apparatus 11 is installed with respect to the door 14 on the opposite side of the authentication apparatus 11 that receives the biological information to be subjected to the authentication, the authentication apparatus 11 causes, based on set positional information of the authentication apparatuses 11, the certain authentication apparatus 11 to be included in the aforementioned other authentication apparatuses 11.

In addition, when any of the requested other authentication apparatuses 11 is in a busy state or currently executes crosschecking for other authentication or the like, the authentication apparatus 11 that receives the biological information to be subjected to the authentication may request, based on the usage frequency information, a next candidate authentication apparatus to execute the crosschecking. Thus, in the embodiment, even when any of requested authentication apparatuses 11 currently executes other authentication or is broken down, the requesting authentication apparatus 11 may quickly execute the authentication without causing a process to stand by.

The managing server 12 generates authentication data (for example, the registered biological information of all the registered people, the positional information of the authentication apparatuses 11, and the like) to be used for user authentication by the authentication apparatuses 11 and transmits the generated data to the authentication apparatuses 11. In addition, the managing server 12 acquires history record data used for authentication by the authentication apparatuses 11 and the like, generates the usage frequency information based on the results of the acquisition, and transmits the generated usage frequency information to the authentication apparatuses 11.

For example, when a user places a hand of the user above or on an authentication apparatus 11 included in the authentication system 10 illustrated in FIG. 1, the authentication apparatus 11 acquires biological information (for example, fingerprints, blood vessels, and the like) read from the hand and requests each of other authentication apparatuses 11 to execute crosschecking for a respective one of groups into which the registered biological information of the registered people have been classified based on the number of the registered people. For example, when a limited number N of people to be subjected to 1:N crosschecking by each authentication apparatus 11 is 100 and the number of the registered people is 200, two authentication apparatuses 11 are used and each execute the crosschecking on classified 100 people. When the limited number is 100 and the number of the registered people is 300, three authentication apparatuses 11 are used and each execute the crosschecking on classified 100 people. In addition, when a certain authentication apparatus 11 requests another authentication apparatus 11 to execute crosschecking and the requested other authentication apparatus 11 currently executes other crosschecking, the certain authentication apparatus 11 requests a next candidate authentication apparatus 11 to execute the crosschecking.

When an authentication apparatus 11 that requests other authentication apparatuses 11 to execute crosschecking receives, from the requested authentication apparatuses 11, crosschecking results that indicate only one person, the requesting authentication apparatus 11 immediately determines that the crosschecking succeed, that is, the requesting authentication apparatus 11 unlocks an interested electric lock 16. When the requesting authentication apparatus 11 receives, from the requested authentication apparatuses 11, crosschecking results that indicate a plurality of people, the requesting authentication apparatus 11 may compare the crosschecking results with each other and determine which of the crosschecking results is superior or inferior to the other. In the embodiment, when a plurality of people of which crosschecking results are equal to or larger than a threshold exist after determining which of the crosschecking results is superior or inferior to the other, the authentication apparatus 11 may execute crosschecking using biological information obtained from the other hand or another part (for example, eyes or the like) and narrow down the people to one person based on results of the crosschecking.

The number of the authentication apparatuses 11, the number of the doors 14, the arrangement of the authentication apparatuses 11, doors 14, and the like are not limited to those illustrated in the example of FIG. 1.

Example of Functional Configurations of Authentication Apparatuses 11

Figure 2:
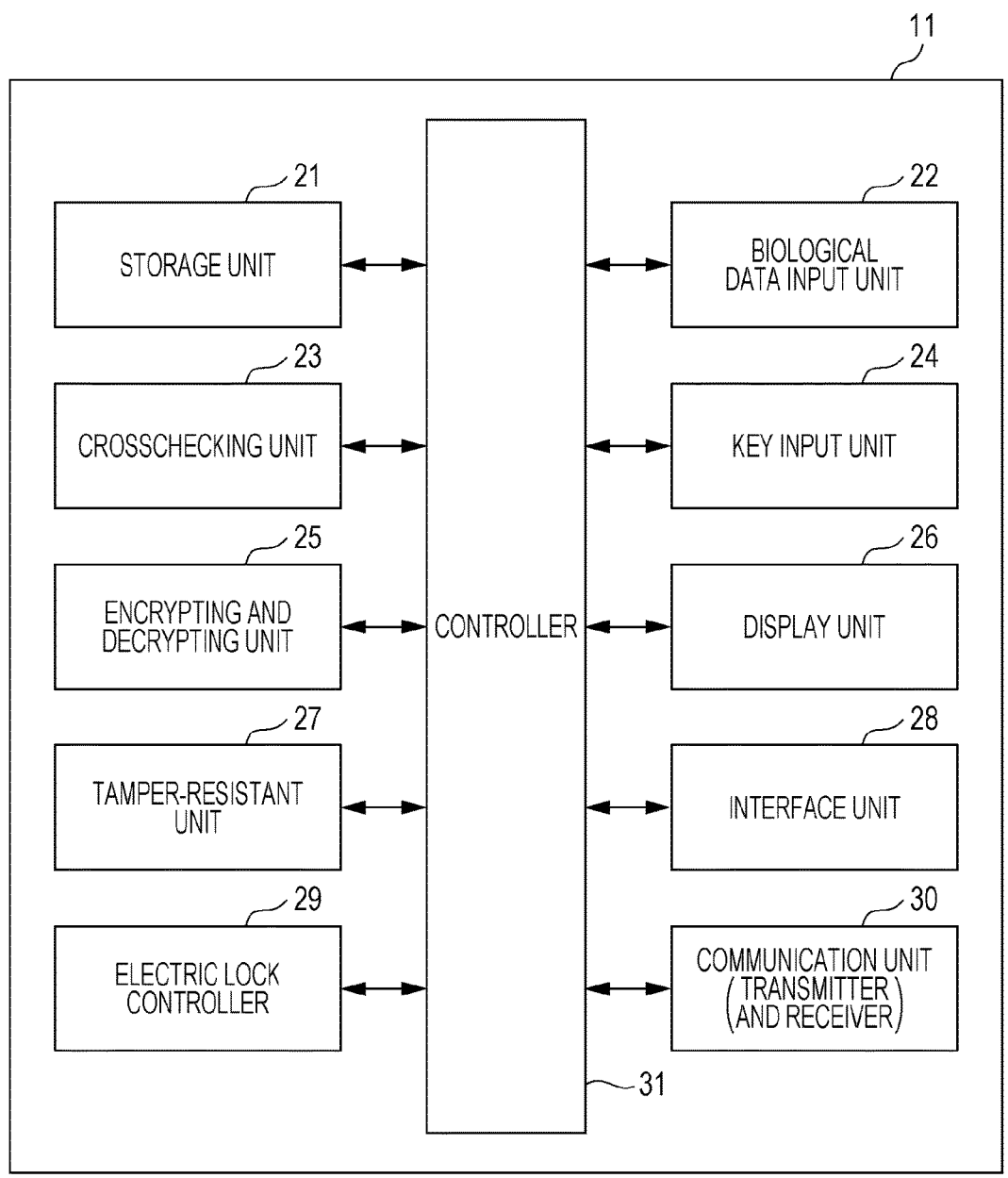
FIG. 2 is a diagram illustrating an example of a functional configuration of an authentication apparatus.

Next, an example of functional configurations of the authentication apparatuses 11 is described with reference to FIG. 2. FIG. 2 is a diagram illustrating the example of the functional configurations of the authentication apparatuses 11. An authentication apparatus 11 illustrated in the example of FIG. 2 includes a storage unit 21, a biological data input unit (biological information input unit) 22, a crosschecking unit 23, a key input unit 24, an encrypting and decrypting unit 25, a display unit 26, a tamper-resistant unit 27, an interface unit 28, an electric lock controller 29, a communication unit (including a transmitter and a receiver) 30, and a controller 31.

The storage unit 21 is a memory, a hard disk (HD), or the like, for example. The storage unit 21 stores various types of information to be managed by the authentication apparatus 11. Data is read and written from and in the storage unit 21.

For example, the storage unit 21 stores biological data to be subjected to authentication, biological characteristic data (biological information to be subjected to authentication) read from the biological data, biological characteristic data (registered biological information) of multiple registered people to be used to authenticate the biological data. Each of the plurality of authentication apparatuses 11 in the authentication system 10 includes registered biological information of at least same users (registered people). In this case, the registered biological information may be biological information of all the registered people, but is not limited to this. In addition, the registered biological information is distributed from the managing server 12 or the like.

In addition, the storage unit 21 stores results of processes, such as the history data record, executed by the crosschecking unit 23 and various types of setting information that is address information and the like and used to achieve the transmission and reception of data between the interested authentication apparatus 11 and the managing server 12 and the other authentication apparatuses 11. The storage unit 21 stores a process request table to be used to request a divided process to each of the other authentication apparatuses 11 to execute a crosschecking process on registered biological information in one of the classified ranges.

The biological data input unit 22 receives, from a user, an entry of biological data to be subjected to the authentication, the is, biological information to be subjected to authentication upon the authentication. The biological data is data representing characteristics of a biological body and is obtained, for example, from physical characteristics of the user or behavioral characteristics of the user. As the physical characteristics, at least one of fingerprints, the shape of a palm, retinas, irises, blood vessels (veins or the like), a voice sound, the shapes of ears may be used. The physical characteristics, however, are not limited to them. As the behavioral characteristics, at least one of handwriting, key stroke authentication, a rip movement such as habit of movements of rips upon speech, blinks, and the like may be used. The behavioral characteristics, however, are not limited to them. The biological data input unit 22 may extract biological characteristic data such as fingerprints or blood vessels from an image or video image acquired by illuminating a hand of the user with predetermined light for example.

The crosschecking unit 23 crosschecks the biological data (biological information to be subjected to authentication) received from the user with biological data (registered biological information) stored in the storage unit 21. When the number of items of the registered biological information of registered people (for example, all the registered people) is equal to or larger than a set number, a process for the crosschecking is processed also on one or more of the other authentication apparatuses 11.

Thus, when receiving the biological information to be subjected to the authentication, the crosschecking unit 23 crosschecks the received biological information with a part of multiple pieces of the registered biological information (biological information of the multiple users). In addition, the crosschecking unit 23 determines whether or not crosschecking results represent that the crosschecking of the biological information to be subjected to the authentication with the registered biological information included in one of the classified ranges succeeds or fails, where the one of the classified ranges into which the registered biological information is divided includes the registered biological information which is allotted to the interested authentication apparatus 11. For example, when a similarity between the biological information to be subjected to the authentication and the registered biological information is equal to or larger than a set threshold set previously, a result of crosschecking the biological information to be subjected to the authentication with registered biological information indicates that the crosschecking succeeds. The crosschecking, however, is not limited to this.

In addition, the crosschecking unit 23 requests the other authentication apparatuses 11 to crosscheck the biological information to be subjected to the authentication with registered biological information of the remaining classified ranges other than the classified range to be processed by the interested authentication apparatus 11 while identifying the remaining classified ranges to be crosschecked. The number of the requested other authentication apparatuses 11 is the number of classified ranges minus 1 and the requested other authentication apparatuses 11 are selected based on positional information and usage frequency information of other multiple authentication apparatuses 11 received from the managing server 12.

For example, the crosschecking unit 23 assigns biological information that is included in the registered biological information and is not the crosschecked part of the biological information to the one or more other authentication apparatuses 11 without assigning the same information to multiple other authentication apparatuses 11, and the crosschecking unit 23 requests, through the communication unit (transmitter) 30, the one or more other authentication apparatuses 11 to crosscheck the biological information to be subjected to the authentication with the assigned biological information. In this case, the crosschecking unit 23 generates, based on the positional information or the usage frequency information, a process request table (classified range assignment information) to be used to identify each of classified ranges of the registered biological information to be crosschecked by each corresponding one of the other authentication apparatuses 11. The aforementioned process request table may be generated by the managing server 12 in advance.

In addition, the crosschecking unit 23 executes final authentication based on result of the crosschecking executed by the crosschecking unit 23 and results, received through the communication unit (receiver) 30, of crosschecking the received biological information with the assigned registered biological information by the one or more authentication apparatuses 11 in response to the request. Furthermore, the crosschecking unit 23 causes, based on the results, the electric lock controller 29 to control opening and closing (an interested electric lock 16) of an interested entrance door (for example, an interested door 14) to the predetermined area.

The key input unit 24 receives a key entry and the like other than biological data. The key entry is, for example, an entry of user information (for example, an ID and a password), but is not limited to this.

The encrypting and decrypting unit 25 encrypts personal information such as biological information using a set encryption method and transmits the encrypted information to the other authentication apparatuses 11 while communicating with the other authentication apparatuses 11 and the managing server 12 through the communication network 13. When receiving encrypted data, the encrypting and decrypting unit 25 decrypts the received data using a decryption method corresponding to the encryption method so as to restore the data to the original data.

The display unit 26 displays results of crosschecking executed by the authentication apparatuses 11 and information (for example, instruction information and the like) that instructs the user to entry biological data. The display unit 26 is, for example, a display, a monitor, or the like, but is not limited to them.

The tamper-resistant unit 27 is software or hardware for processing and storing confidential information within the interested authentication apparatus 11. The apparatuses that handle personal information such as biological data and the like may take various defense measures so as to unable the information to be easily analyzed by externals. Thus, the tamper-resistant unit 27 inhibits data from being read by abnormal methods.

The interface unit 28 is an interface for input and output of signals to be used to control the electric lock 16 and an interface for the display unit 26. In addition, the interface unit 28 may be an interface for an external memory. The interface unit 28 communicates with the other authentication apparatuses 11 and the managing server 12 through the communication network 13. Furthermore, the interface unit 28 may be an interface to be used to communicate with the managing server 12, the other authentication apparatuses 11, external devices, and the like through the communication network 13.

The electric lock controller 29 corresponds to the aforementioned electric lock controller 15 illustrated in the example of FIG. 1. The electric lock controller 29 controls opening and closing of the electric lock 16 based on results of crosschecking biological data by the crosschecking unit 23.

The communication unit 30 includes functions of the transmitter and the receiver. The communication unit 30 transmits and receives data to and from the managing server 12, one or more of the other authentication apparatuses 11, external devices connected through the communication network 13, and the like through the communication network 13.

For example, the communication unit 30 transmits, to one or more of the other authentication apparatuses 11 through the communication network 13, send requests (crosschecking request data) to crosscheck the received biological information to be subjected to the authentication with the other registered biological information which is assigned to the other authentication apparatuses 11 by the crosschecking unit 23 and do not include the crosschecked registered biological information.

In addition, the communication unit 30 receives results of crosschecking the received biological information with the assigned registered biological information by the one or more other authentication apparatuses 11 in response to the aforementioned crosschecking requests.

In addition, the communication unit 30 receives, from the managing server 12, crosschecking request data, the positional information of the authentication apparatuses 11, a time zone usage frequency table, biological information (registered biological information) of users which the number is preferably same one sent to each of the one or more other authentication apparatuses 11, and the like. In this case, the registered biological information may be the biological information of all the registered people, but is not limited to this. In addition, the communication unit 30 transmits, to the managing server 12, history record data of an authentication process at predetermined intervals or at predetermined times.

The controller 31 controls all the configurations of the authentication apparatus 11. For example, the controller 31 controls storage by the storage unit 21, input of biological data by the biological data input unit 22, the crosschecking process by the crosschecking unit 23, key input by the key input unit 24, screen display by the display unit 26, reading control by the tamper-resistant unit 27, interface control by the interface unit 28, control of opening and closing of the electric lock 16 by the electric lock controller 29, data communication by the communication unit 30, and the like. The control by the controller 31 is not limited to the aforementioned control. For example, the controller 31 may control a process to be executed upon the occurrence of an error, management of logs, and the like.

Example of Functional Configuration of Managing Server 12

Figure 3:
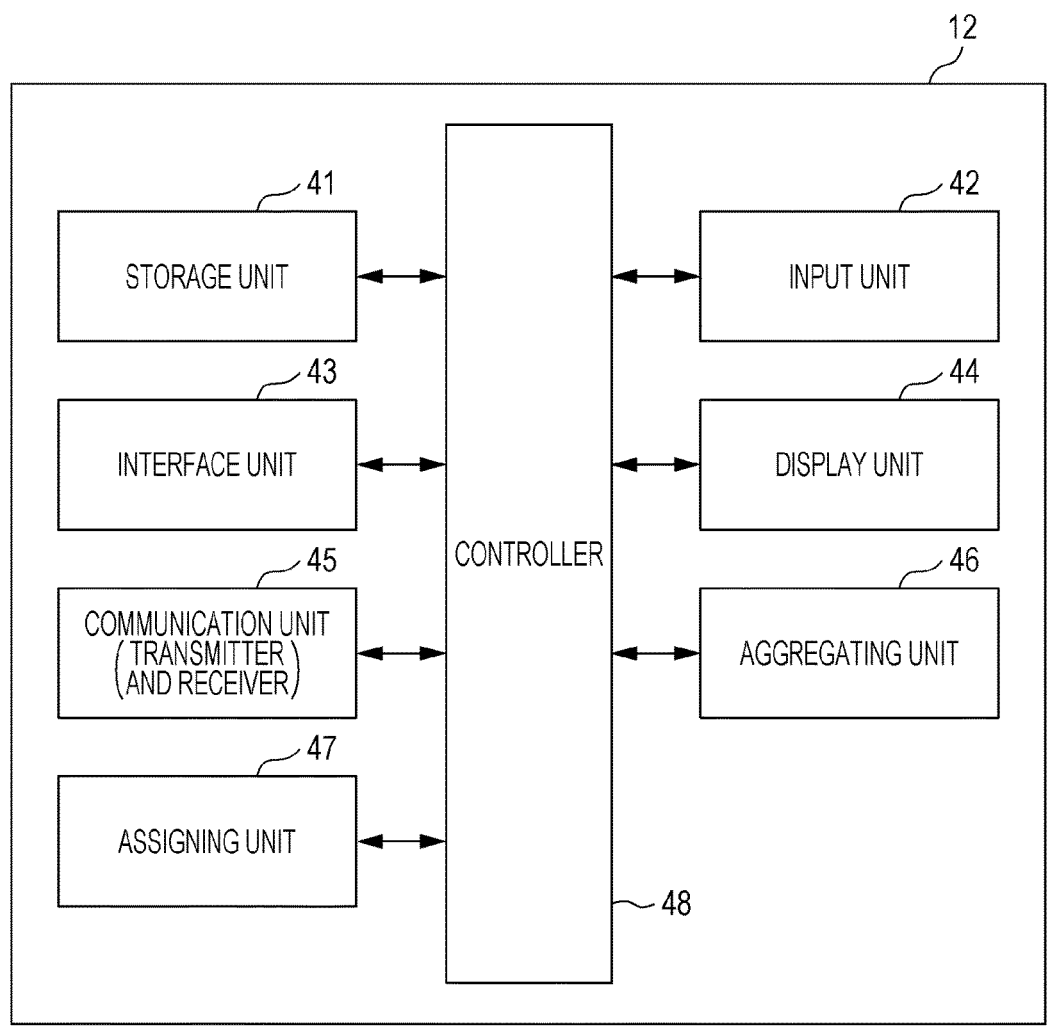
FIG. 3 is a diagram illustrating an example of a functional configuration of a managing server.

Next, an example of a functional configuration of the managing server 12 is described with reference to FIG. 3. FIG. 3 is a diagram illustrating the example of the functional configuration of the managing server. The managing server 12 illustrated in FIG. 3 includes a storage unit 41, an input unit 42, an interface unit 43, a display unit 44, a communication unit (including a transmitter and a receiver) 45, an aggregating unit 46, an assigning unit 47, and a controller 48.

The storage unit 41 is, for example, a memory, a hard disk (HD), or the like and stores various types of information to be managed by the managing server 12. The storage unit 41 may read and write predetermined data. For example, the storage unit 41 stores registered biological characteristic data, to be used for authentication, of multiple previously registered people, the process request table to be used to identify classified ranges to be subjected to the crosschecking process, and the like. In addition, the storage unit 41 stores history record data, received from the authentication apparatuses 11 connected to the communication network 13, of the authentication process. The storage unit 41 stores results of aggregation executed by the aggregating unit 46, results of assignments, executed by the assigning unit 47, of the classified ranges to be subjected to the crosschecking process, and the like.

The input unit 42 receives a key entry executed by a user such as an administrator in order to operate the managing server 12. The input unit 42 is, for example, a keyboard or the like, but is not limited to this.

The interface unit 43 generates an interface to be used to provide various types of information from the display unit 44 to the administrator who manages the managing server 12 or the like. In addition, the interface unit 43 may be an interface to be used to communicate with external devices and the authentication apparatuses 11 through the communication network 13. Furthermore, the interface unit 43 may be an interface for an external memory or an interface for the display unit 44.

The display unit 44 displays, to the administrator, an interface generated by the interface unit 43 for assignments of classified ranges to be subjected to the crosschecking process, crosschecking results, history record data, and the like. The display unit 44 may display an interface screen generated by the interface unit 43 and other information.

The communication unit 45 includes functions of the transmitter and the receiver. The communication unit 45 transmits and receives data to and from the authentication apparatuses 11 and external devices through the communication network 13. For example, the communication unit 45 receives history record data of the authentication process from the authentication apparatuses 11 at predetermined intervals or at predetermined times. In addition, the communication unit 45 transmits, to the authentication apparatuses 11, the registered biological information of all the registered people, crosschecking request data, the positional information of the authentication apparatuses, the time zone usage frequency table, and the like.

The aggregating unit 46 acquires history record data of the crosschecking process from the plurality of authentication apparatuses 11 and aggregates information included in the acquired history record data, where the information includes information on the numbers of times of crosschecking, times when the crosschecking is executed, and the like. In addition, the aggregating unit 46 acquires, based on results of the aggregation, information such as usage frequencies and ranks in set time zones and the like.

The assigning unit 47 generates, based on the results of the aggregation executed by the aggregating unit 46, a process request table (classified range assignment information or the like) to be used to identify classified ranges for segmented crosschecking process. When the process request table is generated by the side of the authentication apparatuses 11 or at least one of the authentication apparatuses 11, the managing server 12 may not include the assigning unit 47. The generated process request table may be stored in the storage unit 41 and transmitted to the authentication apparatuses 11 through the communication unit 45.

The controller 48 controls all configurations of the managing server 12. For example, the controller 48 controls storage by the storage unit 41, input by the input unit 42, interface control by the interface unit 43, screen display by the display unit 44, data communication by the communication unit 45, and the like. In addition, the controller 48 controls the aggregation unit 46 so as to aggregate history record data for the crosschecking process received from the authentication apparatuses 11 and the assigning unit 47 so as to segment the crosschecking process. The control by the controller 48 is not limited to the aforementioned control. For example, the controller 48 may control a process to be executed upon the occurrence of an error, management of logs, and the like.

Example of Hardware Configurations

Figure 4:
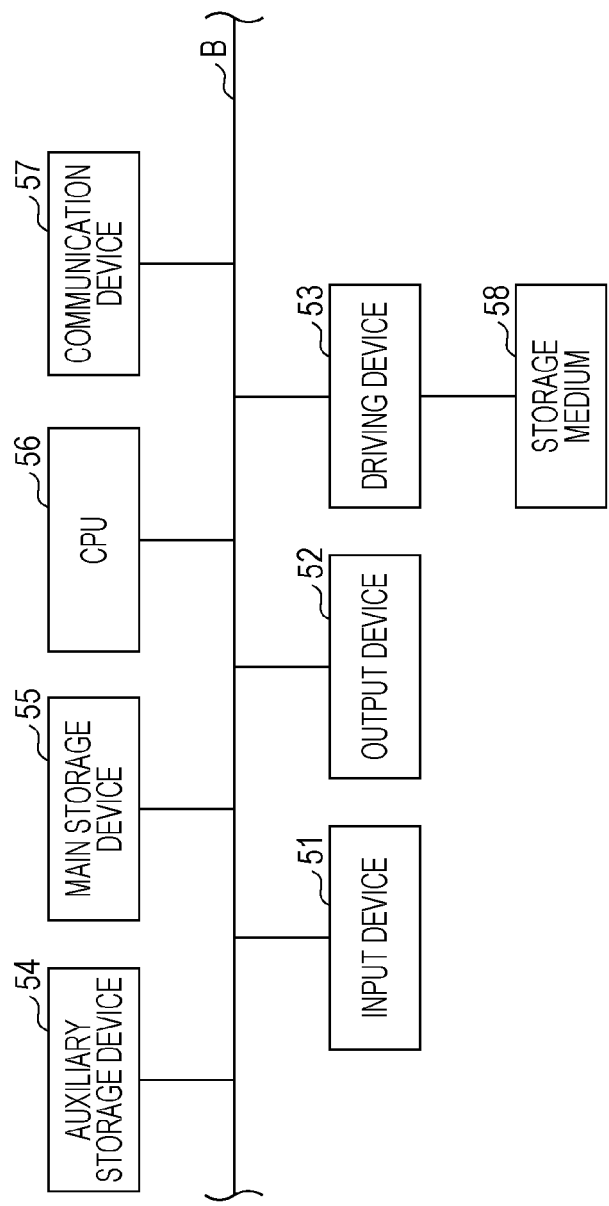
FIG. 4 is a diagram illustrating an example of a hardware configuration.

An example of hardware configurations of computers that are the authentication apparatuses 11, the managing server 12, and the like is described below with reference to FIG. 4. FIG. 4 is a diagram illustrating the example of the hardware configurations. In the example illustrated in FIG. 4, computers as the authentication apparatuses 11, the managing server 12, and the like each include an input device 51, an output device 52, a driving device 53, an auxiliary storage device 54, a main storage device 55, a central processing unit (CPU) 56, and a communication device 57 that are connected to each other by a system bus B.

The input device 51 includes at least one of an audio input device such as a microphone and pointing devices such as a keyboard and a mouse that are operated by a user (for example, a person to be subjected to the authentication, an administrator, or the like). The input device 51 receives, from the user or the like, an entry of an instruction to execute a program, entries of various types of operational information, an entry of information to be used to activate software and the like, and the like.

The output device 52 includes a display configured to display various windows and data that are used to operate the computer (authentication apparatus 11 or managing server 12) for the execution of the process according to the embodiment and the like. The output device 52 may display the progress and results of the execution of the program by a control program included in the CPU 56.

In the embodiment, an execution program installed in the computer is provided from a recording medium 58 or the like, for example. The recording medium 58 may be set in the driving device 53. The execution program stored in the recording medium 58 is installed in the auxiliary storage device 54 from the recording medium 58 through the driving device 53 based on a control signal provided by the CPU 56.

The auxiliary storage device 54 is a storage unit such as a hard disk drive (HDD) or a solid state drive (SSD) or the like, for example. The auxiliary storage device 54 is configured to store, based on control signals provided by the CPU 56, the execution program (authentication program) according to the embodiment, the control program installed in the computer, and the like and receive and output the execution program, the control program, and the like. The auxiliary storage device 54 may read information from stored information based on a control signal provided by the CPU 56 and may write information based on a control signal provided by the CPU 56.

The main storage device 55 is configured to store the execution program read by the CPU 56 from the auxiliary storage device 54 and the like. The main storage device 55 is a read only memory (ROM), a random access memory (RAM), or the like. The auxiliary storage device 54 and the main storage device 55 are an example of the storage unit 21 included in the authentication apparatus 11 and are an example of the storage unit 41 included in the managing server 12.

The CPU 56 achieves various processes by controlling processes of the overall computer or executing various types of calculation, controlling input and output of data to and from the hardware constituent units, and the like based on the control program such as an operating system (OS) and the execution program stored in the main storage device 55. The CPU 56 may acquire, from the auxiliary storage device 54, information to be used during the execution of the programs, and may cause results of the execution to be stored in the auxiliary storage device 54.

Specifically, the CPU 56 executes the program installed in the auxiliary storage device 54 and thereby executes the process corresponding to the program on the main storage device 56 based on an instruction, received from the input device 51, to execute the program or the like, for example.

For example, when the computer is an authentication apparatus 11, the CPU 56 executes the execution program and thereby controls storage by the storage unit 21, input of biological data by the biological data input unit 22, the crosschecking process by the crosschecking unit 23, key input by the key input unit 24, encryption and decryption processes by the encrypting and decrypting unit 25, and the like. In addition, the CPU 56 controls screen display by the display unit 26, reading control by the tamper-resistant unit 27, interface control by the interface unit 28, control of opening and closing of the electric lock 16 by the electric lock controller 29, data communication by the communication unit 30, and the like.

When the computer is the managing server 12, the CPU 56 executes the execution program and thereby controls storage by the storage unit 41, input by the input unit 42, interface control by the interface unit 43, screen display by the display unit 44, data communication by the communication unit 45, and the like. In addition, the CPU 56 controls the aggregation of history record data, received from the authentication apparatuses 11, of the crosschecking process, assignments executed by the assigning unit 47 for segmented crosschecking process, and the like.

The processes by the CPU 56 are not limited to the aforementioned details. The details of the processes executed by the CPU 56 may be stored as appropriate in the auxiliary storage device 54 or the like. The CPU 56 is an example of the controller 31 included in the authentication apparatus 11 and is an example of the controller 48 included in the managing server 12, for example.

The communication device 57 communicates with the authentication apparatuses 11, the managing server 12 which are coupled to the communication network 13, external devices, and the like. The communication device 57 is coupled to the communication network 13 based on control signals provided by the CPU 56 to acquire the execution program, software, setting information, various process results, and the like from the authentication apparatuses 11, the managing server 12, the external devices, and the like. In addition, the communication device 57 may provide execution results obtained by executing the program to the authentication apparatuses 11, the managing server 12, and the external devices and provide the execution program according to the embodiment to the authentication apparatuses 11, the managing server 12, and the external devices. The communication device 57 is an example of the communication unit 30 included in the authentication apparatus 11 and is an example of the communication unit 45 included in the managing server 12.

The recording medium 58 is a computer-readable recording medium storing the execution program and the like as described above. The recording medium 58 is a semiconductor memory such as a flash memory or a portable recording medium such as a CD-ROM or a DVD, but is not limited to them.

The authentication process according to the embodiment and the like may be achieved by installing the execution program (for example, the authentication program or the like) in the hardware configuration illustrated in FIG. 4 and causing the hardware resources and the software to collaborate with each other.

First Example

Next, a first example of the embodiment is described in detail with reference to drawings. When the authentication process is executed on a biological body, crosschecking is preferably executed by placing a finger or hand of a user above or on the biological data input unit 22. This crosschecking is referred to as "1:N crosschecking" and N is the number of the registered people. When the 1:N crosschecking is executed and the number N is large, the following problems may occur. That is, it may take time to execute the crosschecking, the authentication system may become intolerant to an operation, the crosschecking may not be executed without a high-performance server (or a distribution process or the like), an extra cost may be incurred, a possibility that another person may be erroneously crosschecked as the identical person may increase, and the like.

In the first example, when the 1:N crosschecking is executed and the number N processed by a single authentication apparatus 11 is small, the authentication system is tolerant to the actual operation and the number of registered people is classified into groups of several ten to several hundred people to be crosschecked by a single authentication apparatus 11 based on the performance (requirements) of the CPUs or the like, for example. For example, when the number N (number of the registered people) is 1000, a time for the authentication process to be executed on biological information may be reduced by classifying the registered people into groups of 100 people for whom each of ten authentication apparatuses 11 crosschecks concurrently the biological information with registered biological information of the 100 registered people.

Figure 5:
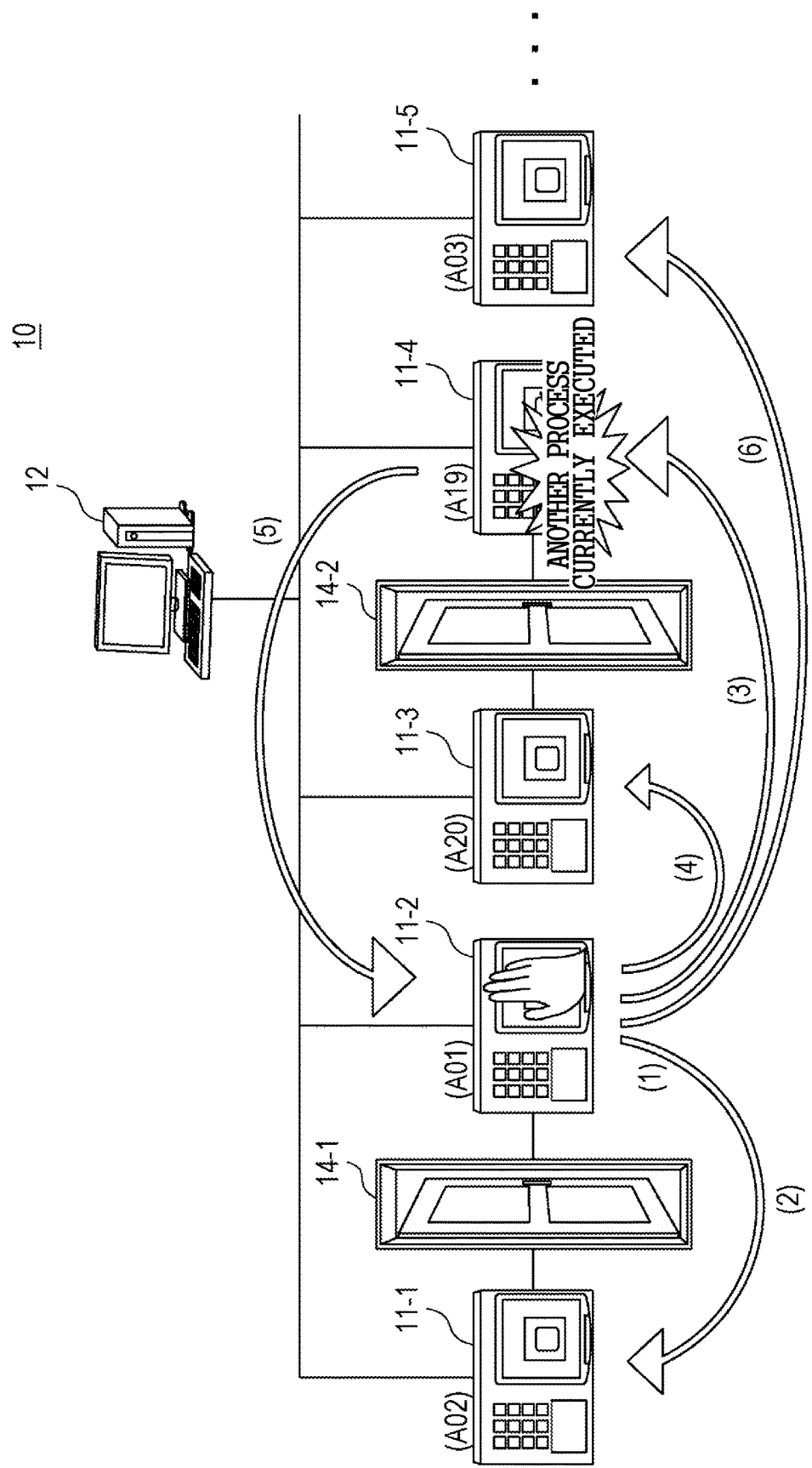
FIG. 5 is a diagram illustrating an example of an authentication process according to a first example.

FIG. 5 is a diagram illustrating an example of the authentication process according to the first example. In the example illustrated in FIG. 5, when the authentication apparatus 11-2 executes the 1:N crosschecking, the authentication apparatus 11-2 distributes the crosschecking process to the authentication apparatuses 11-1 and 11-3 to 11-5 and requests each of the authentication apparatuses 11-1 and 11-3 to 11-5 to execute the crosschecking process or execute small-scale 1:M (M<N) crosschecking instead of the large-scale 1:N crosschecking.

In the first example, usage frequencies of the authentication apparatuses 11 in each time zone are calculated as references to be used to distribute the aforementioned crosschecking process and the crosschecking process is distributed to authentication apparatuses 11 of which the calculated usage frequencies are low. In the first example, when the authentication apparatus 11-2 requests an authentication apparatus 11 of which the usage frequency is low to execute the crosschecking process, and the requested authentication apparatus 11 is used by a user (or is in a busy state), the authentication apparatus 11-2 requests another authentication apparatus 11 of which the usage frequency is low to execute the crosschecking process.

In addition, usage frequencies of the authentication apparatuses 11 in each time zone may be acquired by the authentication apparatuses 11, since the managing server 12 collects history record data (log information) from the authentication apparatuses 11 at predetermined times, generate the time zone usage frequency table, and distributes the generated time zone usage frequency table to the authentication apparatuses 11.

In the first example, when a plurality of people of which crosschecking results represent that similarities between biological information of the people and registered biological information are close to each other exist, a process (re-crosschecking process or the like) of crosschecking biological data of the other hand with the registered biological information and narrowing down the people to a single person may be executed.

Example of Data of Various Types According to First Example

FIGS. 6A, 6B, and 6C are diagrams illustrating examples of data of various types according to the first example. FIG. 6A illustrates an example of a biological data table (the registered biological information (registered biological data) of all the registered people). FIG. 6B illustrates an example of classified range assignment information. FIG. 6C illustrates an example of the time zone usage frequency table.

A biological data table illustrated in the example of FIG. 6A includes, as items, "user IDs", "biological data", and the like, for example, but is not limited to this. The user IDs are information identifying users (registered people). The biological data is biological information (correct data) registered for each of the users and provided for authentication. The biological information is, for example, biological characteristic data such as fingerprints, blood vessels (for example, veins), and the like, but is not limited to them.

Classified range assignment information illustrated in the example of FIG. 6B includes "classification Nos.", "user IDs targeted for crosschecking", "crosschecking requesting and requested apparatus IDs", and the like, for example, but is not limited to this. The classification Nos. are information identifying groups (a predetermined number of classified ranges of the registered biological information) classified and assigned. The user IDs targeted for crosschecking are information in which ranges of numbers of users targeted for the crosschecking are set. The crosschecking requesting and requested apparatus IDs are information identifying authentication apparatuses corresponding to the classification Nos. According to the classified range assignment information illustrated in FIG. 6B, registered people of which the number N is 400 are classified into a predetermined number (4 in FIG. 6B) of groups. In the first example, a process part (or a range to be subjected to the crosschecking process) to be achieved by each authentication apparatus 11 may be set based on the classification illustrated in FIG. 6B.

A time zone usage frequency table illustrated in the example of FIG. 6C includes, as items, "apparatus IDs", "usage frequencies (ranks for each day) in each time zone", and the like, for example, but is not limited to this. The apparatus IDs are information identifying authentication apparatuses 11. The "usage frequencies in each time zone (ranks for each day)" represent average numbers of times of crosschecking in each time zone in a single day for the authentication apparatuses 11 and ranks based on average numbers of times of crosschecking in each time zone in the single day for the authentication apparatuses 11.

In the example illustrated in FIG. 6C, usage frequencies and ranks of 20 authentication apparatuses 11 (for example, apparatus IDs A01 to A20) in each of set time zones are set, for example. In the example illustrated in FIG. 6C, the time zones are set to a time zone from 6:00 to 12:00, a time zone from 12:00 to 18:00, a time zone from 18:00 to 24:00, and a time zone from 24:00 to 6:00, but are not limited to this.

Specific Example of First Example

A specific example of the first example is described below. The first example assumes that the authentication apparatus 11-2 (having the apparatus ID A01) executes the crosschecking process at 8:00 AM. In this case, the first example assumes that a maximum number N of registered people (users) to be crosschecked by a single authentication apparatus 11 is 100.

For example, when the number N of the registered users is 400, 4 (=400/100) authentication apparatuses 11 may execute the crosschecking process in the first example. In this case, the requesting authentication apparatus 11-2 and the authentication apparatus 11-1 (A02) installed on the opposite side of the authentication apparatus 11-2 with respect to the same door 14 for which the authentication apparatuses 11-1 and 11-2 are installed execute the crosschecking process on a priority basis ((1) and (2) illustrated in the example of FIG. 5). In the first example, since a certain authentication apparatus that receives biological data to be subjected to authentication, and another authentication apparatus that is installed on the opposite side of the certain authentication apparatus with respect to a door 14 close in distance to the certain authentication apparatus, are used based on the positional information of the authentication apparatuses 11 or the like, a load on the communication network 13 may be reduced, compared with a case where the certain authentication apparatus is far from the other authentication apparatus. A reason why the authentication apparatus installed on the opposite side with respect to the door is used on a priority basis is that a possibility that the authentication apparatus installed on the opposite side with respect to the door is not used is high, for example.

In addition, the authentication apparatus 11-2 requests the two authentication apparatuses (authentication apparatuses 11-3 (A20) and 11-4 (A19) illustrated in FIG. 5) selected in order from the lowest usage frequency to execute the crosschecking process on remaining classified ranges ((3) and (4) illustrated in FIG. 5).

In the first example, when the authentication apparatus 11-4 (A19) executes another crosschecking process, the authentication apparatus 11-4 notifies the requesting authentication apparatus 11-2 of busy information ((5) illustrated in FIG. 5). Thus, the authentication apparatus 11-2 transmits a request to execute the crosschecking process to the authentication apparatus 11-5 (A03) that is a next candidate ((6) illustrated in FIG. 5). Information of the assignments of the aforementioned classified ranges to be subjected to the crosschecking process may be registered in the classified range assignment information illustrated in FIG. 6B or the like.

As a result, in the aforementioned example, the authentication apparatus 11-2 (A01) crosschecks biological data to be subjected to authentication with registered biological data of users of which IDs are in a range of 0001 to 0100, and the authentication apparatus 11-1 (A02) crosschecks the biological information to be subjected to the authentication with registered biological data of users of which IDs are in a range of 0101 to 0200. In addition, the authentication apparatus 11-5 (A03) crosschecks the biological information to be subjected to the authentication with registered biological data of users of which IDs are in a range of 0201 to 0300, and the authentication apparatus 11-3 (A20) crosschecks the biological information to be subjected to the authentication with registered biological data of users of which IDs are in a range of 0301 to 0400.

In addition, the authentication apparatus 11-2 receives results of the crosschecking process executed by the other authentication apparatuses, executes the authentication on the user based on the received crosschecking results, and controls opening and closing of the door 14-1 based on the result of the authentication.

Example of Authentication of Process According to First Example

Figure 7B:
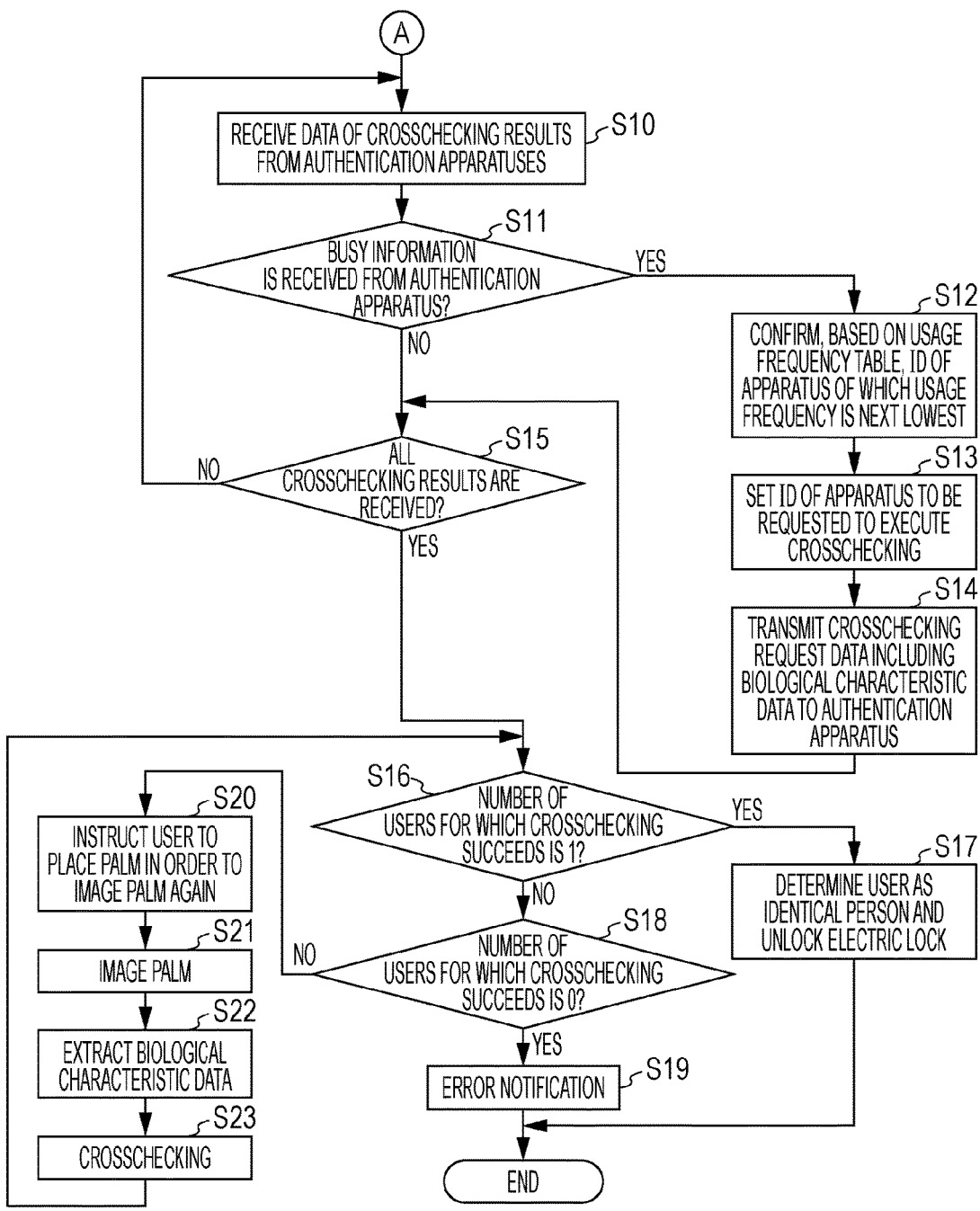

FIGS. 7A and 7B are a flowchart of an example of the authentication process according to the first example. In the example illustrated in FIGS. 7A and 7B, the biological data input unit 22 of an authentication apparatus 11 determines whether the biological data input unit 22 has detected a palm of a user (in S01). When the biological data input unit 22 has not detected the palm (No in S01), the biological data input unit 22 stands by until detecting the palm. When the biological data input unit 22 has detected the palm (Yes in S01), the biological data input unit 22 images the palm (in S02) and extracts biological characteristic data (biological data to be subjected to the authentication) (in S03). Next, the crosschecking unit 23 of the authentication apparatus 11 acquires a current time (in S04) and references the time zone usage frequency table illustrated in FIG. 6C or the like (in S05).

Next, the crosschecking unit 23 confirms apparatus IDs of authentication apparatuses of which usage frequencies are low at the current time (in S06) and sets the apparatus IDs for the number of the authentication apparatuses to be requested to execute the crosschecking process (in S07). In the process of S06, the interested authentication apparatus 11 that has received the biological data, and an authentication apparatus 11 installed on the opposite side of the interested authentication apparatus 11 with respect to a door 14 corresponding to the interested authentication apparatus 11, may execute the crosschecking process on a priority basis.

Next, the crosschecking unit 23 transmits crosschecking request data including the biological characteristic data to the authentication apparatuses 11 to be requested to execute the crosschecking process (in S08) and executes the crosschecking process in the interested authentication apparatus 11 (in S09). Then, the crosschecking unit 23 receives data of results of the crosschecking process from the authentication apparatuses 11 requested to execute the crosschecking process (in S10). The crosschecking unit 23 determines whether or not the crosschecking unit 23 has received busy information from at least one of the requested authentication apparatuses 11 (in S11). When the crosschecking unit 23 has received the busy information (Yes in S11), the crosschecking unit 23 confirms, based on the usage frequency table, an apparatus ID of an authentication apparatus 11 of which a usage frequency is next lowest (in S12), and the crosschecking unit 23 sets the apparatus ID of the confirmed authentication apparatus 11 to be requested to execute the crosschecking process (in S13) and transmits the crosschecking request data including the biological characteristic data to the confirmed authentication apparatus 11 (in S14).

When the crosschecking unit 23 has not received the busy information (No in S11), the crosschecking unit 23 determines whether or not the crosschecking unit 23 has received all crosschecking results after the process of S14 (in S15). When the crosschecking unit 23 has not received crosschecking results from at least one of the requested authentication apparatuses 11 (No in S15), the crosschecking unit 23 causes the process to return to S10. When the crosschecking unit 23 has received all the crosschecking results (Yes in S15), the crosschecking unit 23 determines, based on the results of the crosschecking process executed by the authentication apparatuses 11, whether or not the number of users for which the crosschecking succeeds is one (in S16).

When the number of users for which the crosschecking succeeds is one (Yes in S16), the crosschecking unit 23 determines the user as the identical person and unlocks the electric lock based on the success of the crosschecking (in S17). When the number of the users for which the crosschecking succeeds is not one (No in S16), the crosschecking unit 23 determines whether or not the number of the users for which the crosschecking succeeds is 0 (in S18). When the number of the users for which the crosschecking succeeds is 0 (Yes in S18), the crosschecking unit 23 treats the authentication as failed authentication and transmits an error notification (in S19). When the number of the users for which the crosschecking succeeds is not 0 (No in S18), the crosschecking unit 23 determines that a plurality of users have been extracted, causes the display unit to display a message to instruct the user to place the palm in order to image the palm again (in S20), and causes the biological data input unit 22 to image the palm (in S21). In the process of S21, the other hand (for example, the left hand) of the user with the palm (of, for example, the right hand) imaged in the process of S02 may be imaged, or the same hand imaged in the process of S02 may be imaged again. When the same hand is imaged again, a message that represents a sentence "Please stretch your fingers out straight" may be output and instruct the user to place the hand with an appropriate posture without bending the fingers and the like in order to appropriately image the hand.

In addition, the crosschecking unit 23 extracts biological characteristic data from a palm image acquired in the process of S21 (in S22), executes the crosschecking process on only registered biological data of which the previous crosschecking succeeds (in S23). Then, the crosschecking unit 23 causes the process to return to the process of S16. In the process of S23, the crosschecking unit 23 executes the crosschecking process on only the registered biological data of which the previous crosschecking succeeds, and thus a process amount may be reduced and the crosschecking process may be executed without being distributed. In the process of S23, the crosschecking process may be distributed to another authentication apparatus 11.

Example of Data to be Used Upon Request for Crosschecking

An example of data to be used upon a request for the crosschecking process is described with reference to FIGS. 8A and 8B. FIGS. 8A and 8B are diagrams illustrating the example of the data to be used upon the request for the crosschecking process. FIG. 8A illustrates an example of data of the request for the crosschecking process, while FIG. 8B illustrates an example of data of crosschecking results.

Crosschecking request data illustrated in FIG. 8A includes, as items, a "function code", a "data length", a "requesting apparatus ID", a "classification No.", a "requested apparatus ID", "biological data", and the like, for example, but is not limited to this. The function code is information identifying a detail of the data. For example, a function code "20H" represents crosschecking request data.

The data length is the length of the overall crosschecking request data. The requesting apparatus ID is information identifying an authentication apparatus 11 that requests the crosschecking process. The classification No. is information identifying a classified range to be subjected to the crosschecking process and is an example of the classification No. of the classified range assignment information illustrated in FIG. 6B. The requested apparatus ID is information identifying an authentication apparatus 11 requested to execute the crosschecking process. The biological data is biological data of a person to be subjected to the authentication and is, for example, information (biological characteristic information) representing characteristic data of a biological body.

Crosschecking result data illustrated in FIG. 8B includes, as items, a "function code", a "data length", a "requested apparatus ID", a "classification No.", a "crosschecking success or failure flag", a "user ID", and an "authentication rate", for example, but is not limited to this.

The function code is information identifying a detail of the data. For example, a function code "21H" represents crosschecking result data. The data length is the length of the overall crosschecking result data.

The requested apparatus ID is information of an authentication apparatus 11 (authentication apparatus 11 that transmits the crosschecking result data) requested to execute the crosschecking process. The classification No. is information identifying the classified range subjected to the crosschecking process. The crosschecking success or failure flag is information identifying whether the crosschecking of the biological data succeeds or fails. For example, when the crosschecking of the biological data succeeds, the crosschecking success or failure flag may represent "1". When the crosschecking of the biological data fails, the crosschecking success or failure flag may represent "0". Alternately, only when the crosschecking of the biological data succeeds, the crosschecking success or failure flag may be set. Regarding determination of whether the crosschecking succeeds or fails, when a similarity between the biological data to be subjected to the authentication and registered biological data is equal to or larger than a set threshold, the crosschecking succeeds. The determination of whether the crosschecking succeeds or fails, however, is not limited to this.

The user ID is information identifying a user associated with the registered biological data of which the crosschecking succeeds or fails. The authentication rate is information representing an authentication rate or a similarity between the biological data subjected to the authentication and the registered biological data.

In the example of the crosschecking result data illustrated in FIG. 8B, results of crosschecking all data items may be stored. In addition, when multiple people (with user IDs) of which authentication rates are equal to or higher than a threshold exist, the user IDs of the people may be sorted in order of descending authentication rate, or a predetermined number of data items with the highest authentication rates may be stored.

When authentication rates or similarities between the biological data subjected to the authentication and all biological data crosschecked by an authentication apparatus 11 are equal to or smaller than the threshold (or the crosschecking of all the biological data fails), the authentication apparatus 11 requested to execute the crosschecking process may transmit, to the requesting authentication apparatus 11, information that represents that the crosschecking of all the biological data fails. When the crosschecking fails and the requested authentication apparatus 11 transmits data in the format of the crosschecking result data, the user ID item of the crosschecking result data is blank or stores a set ID (for example, 0000, 9999, or the like).

Another Example of Time Zone Usage Frequency Table

Another example of the time zone usage frequency table is described below. The aforementioned time zone usage frequency table illustrated in FIG. 6C represents the usage frequency ranks calculated from history record data of the authentication apparatuses 11 for each day. In the embodiment, however, history record data for predetermined time periods of weeks, months, or the like may be collected and a time zone usage frequency table may be generated from the collected history record data.

Figure 9:
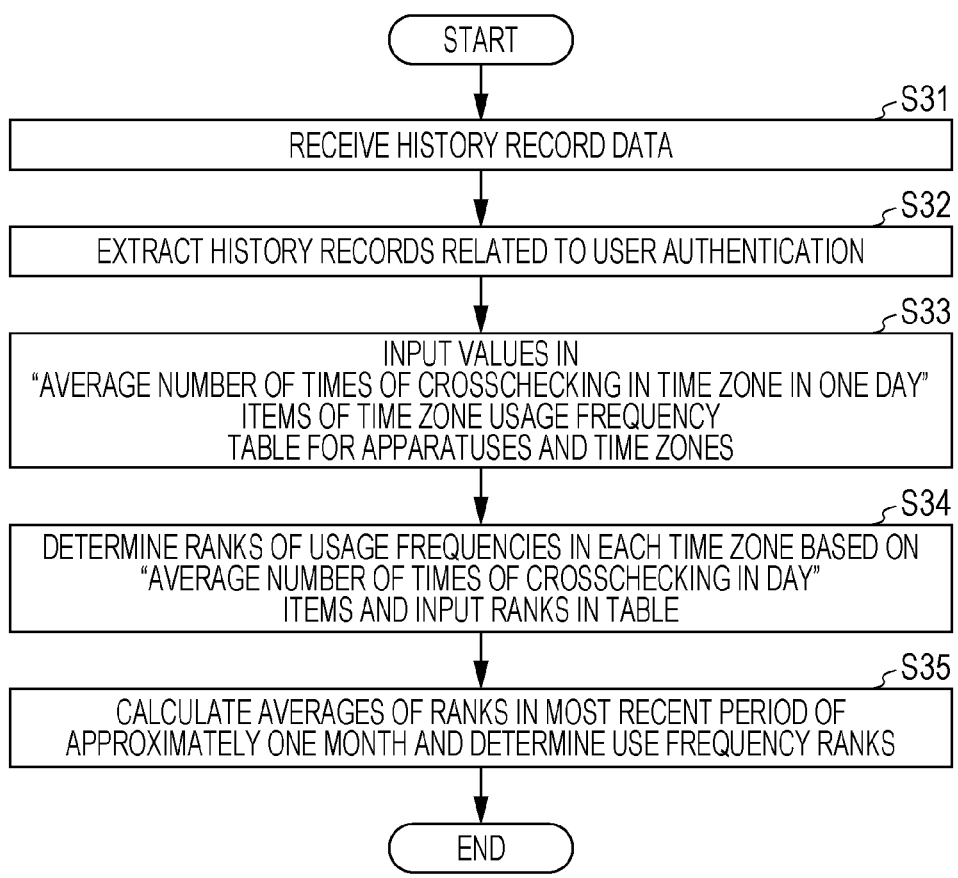
FIG. 9 is a flowchart of an example of a process of generating a monthly time zone usage frequency table.

FIG. 9 is a flowchart of an example of a process of generating a monthly time zone usage frequency table. FIG. 10 is a diagram illustrating the monthly time zone usage frequency table. In an example of FIG. 10, the monthly zone usage frequency table that is generated by the generation process illustrated in FIG. 9 is illustrated.

For example, the assigning unit 47 of the managing server 12 executes a batch process or the like at a specific time at midnight and thereby generates (and updates) the time zone usage frequency table. In the example illustrated in FIG. 9, the assigning unit 47 of the managing server 12 receives history record data from the authentication apparatuses 11 at predetermined time intervals or at predetermined times (in S31) and extracts history records related to user authentication (in S32).

Next, the assigning unit 47 inputs values in "average number of times of crosschecking in the time zone in one day" items of the time zone usage frequency table for the authentication apparatuses and the time zones (in S33).

Next, the assigning unit 47 determines ranks of usage frequencies in each time zone based on the "average number of times of crosschecking in the time zone in one day" items and inputs the ranks in the table (in S34). After the process of S34, the assigning unit 47 calculates averages of ranks in the most recent time period of a month or the like and determines the average ranks of usage frequencies in the most recent time period of a month or the like (in S35).

As illustrated in FIG. 10, the average ranks in the most recent time period of one month or the like may be calculated by the aforementioned process, for example. In the example illustrated in FIG. 10, only the apparatus IDs of the authentication apparatuses 11 and the average ranks in the predetermined time zones in the most recent time period of one month are illustrated, but the time zone usage frequency table is not limited to this. For example, the time zone usage frequency table may include average numbers of times of crosschecking in one month and the like. In addition, the time zone usage frequency table may be generated based on average ranks in the most recent time period of three months or based on days of the week.

Second Example

Next, an authentication process according to a second example is described with reference to FIGS. 11A and 11B. The second example describes the 1:N crosschecking in which a number N of registered people are classified and processed by authentication apparatuses 11 of which the number is variable.

Example of Authentication Process According to Second Example

Figure 11B:
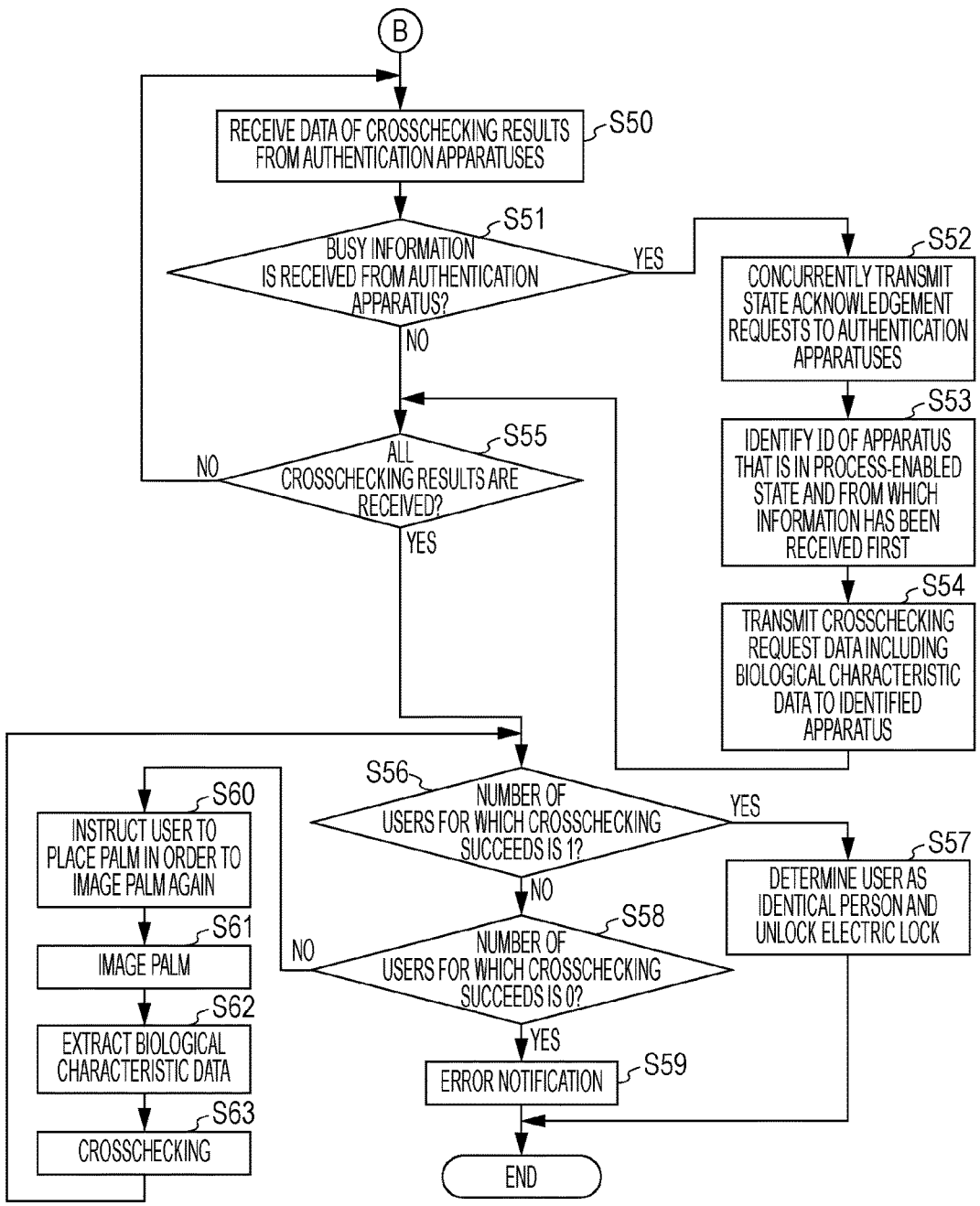

FIGS. 11A and 11B are a flowchart of an example of the authentication process according to the second example. In the example illustrated in FIGS. 11A and 11B, the crosschecking unit 23 of an interested authentication apparatus 11 determines whether or not a palm of a user has been detected (in S41). When the palm has not been detected (No in S41), the crosschecking unit 23 stands by until detecting the palm.

When the palm has been detected (Yes in S41), the crosschecking unit 23 images the palm (in S42) and extracts biological characteristic data (in S43).

Next, the crosschecking unit 23 concurrently transmits state acknowledgement requests to the authentication apparatuses 11 other than the interested authentication apparatus 11 (in S44) and receives state responses from the other authentication apparatuses 11 (in S45). Then, the crosschecking unit 23 identifies apparatus IDs of authentication apparatuses (able to execute the crosschecking process) that are not in a busy state based on the responses which the interested authentication apparatus 11 have received before a specific time (in S46). The crosschecking unit 23 divides the number of registered people by the number of the authentication apparatuses that are able to execute the crosschecking process and generates a process request table (in S47). The process request table generated in S47 is described later.

Next, the crosschecking unit 23 transmits crosschecking request data including the biological characteristic data to the other authentication apparatuses 11 requested to execute the crosschecking process (in S48) and executes the crosschecking process in the interested authentication apparatus (in S49). Then, the crosschecking unit 23 receives crosschecking result data from the other authentication apparatuses (in S50) and determines whether or not the crosschecking unit 23 has received busy information from at least one of the other authentication apparatuses (in S51).

When the crosschecking unit 23 has received the busy information (Yes in S51), the crosschecking unit 23 concurrently transmits state acknowledgement requests to the other authentication apparatuses 11 (in S52) and identifies an apparatus ID of an authentication apparatus 11 from which the crosschecking unit 23 receives first the information indicating processability of the crosschecking process (in S53). Next, the crosschecking unit 23 transmits crosschecking request data including the biological characteristic data to the identified authentication apparatus 11 (in S54).

When the interested authentication apparatus 11 has not received the busy information (No in S51), the crosschecking unit 23 determines whether or not the crosschecking unit 23 has received all crosschecking results (in S55). When the crosschecking unit 23 has not received crosschecking results from at least one of the other authentication apparatuses (No in S55), the process returns to S50. When the interested authentication apparatus 11 has received all the crosschecking results (Yes in S55), the crosschecking unit 23 determines whether or not the number of users for which the crosschecking succeeds is 1 (in S56).

When the number of the users for which the crosschecking succeeds is one (Yes in S56), the crosschecking unit 23 determines the user as the identical person and controls the electric lock so as to unlock the electric lock (in S57). When the number of the users for which the crosschecking succeeds is not one (No in S56), the crosschecking unit 23 determines whether or not the number of the users for which the crosschecking succeeds is 0 (in S58). When the number of the users for which the crosschecking succeeds is 0 (Yes in S58), the crosschecking unit 23 treats the authentication as failed authentication and transmits an error notification (in S59). When the number of users for which the crosschecking succeeds is not 0 (No in S58), the crosschecking unit 23 determines that the plurality of users have been extracted, causes the display unit 26 to display a message to instruct the user to place the palm again in order to image the palm (in S60), and causes the biological data input unit 22 to image the palm (in S61) in the same manner as the first embodiment. The crosschecking unit 23 extracts biological characteristic data (in S62) and crosschecks the extracted biological characteristic data with only registered biological data of which the previous crosschecking succeeds (in S63). Then, the process returns to S56.

Examples of Data of Various Types According to Second Example

Next, examples of data of various types according to the second example are described. FIGS. 12A and 12B are diagrams illustrating an example of the state acknowledgement requests according to the second example and an example of the responses to the state acknowledgement requests. FIG. 12A illustrates the example of data of the state acknowledgement requests, while FIG. 12B illustrates the example of data of the state responses.

State acknowledgement request data illustrated in FIG. 12A includes, as items, a "function code", a "data length", a "requesting apparatus ID", and a "current time", for example, but is not limited to this. The function code is information identifying a detail of the data. For example, a function code "30H" represents state acknowledgement request data.

The data length is the length of the overall state acknowledgement request data. The requesting apparatus ID is information identifying an authentication apparatus 11 that provides the state acknowledgement request. The current time is information of a time when the state acknowledgement request is provided.

State response data illustrated in FIG. 12B includes, as items, a "function data", a "data length", a "responding apparatus ID", a "response time", a "state", and the like, for example, but is not limited to this. The function code is information identifying a detail of the data. For example, a function code "31H" represents state response data. The data length is the length of the overall state response data.

The responding apparatus ID is information identifying an authentication apparatus 11 that transmits the state response data. The response time is information of a time when the response is provided. The state is information representing the state of the authentication apparatus 11 that transmits the state response data. Information that represents a process-enabled state, a busy state, or the like is set in the state, but the state is not limited to this.

FIG. 13 is a diagram illustrating an example of the process request table according to the second example. FIG. 13 illustrates the example of the process request table generated in the process of S47 according to the second example.

A process request table illustrated in FIG. 13 includes, as items, "classified user IDs" and an "apparatus ID", for example, but is not limited to this. FIG. 13 illustrates the example in which 9 authentication apparatuses 11 that are in the process-enabled state or able to execute the crosschecking process on 400 registered people (registered biological information of all the registered people) are identified based on results of responses to state acknowledgement requests. In this case, 44 people (≅400 people÷9 apparatuses) are assigned to each of the 9 authentication apparatuses 11. The remaining 4 people are set in the interested authentication apparatus 11 so as to ensure that the interested authentication apparatus 11 executes the crosschecking process on biological data of the remaining 4 people.

In the second example, the interested authentication apparatus 11 may assign the crosschecking process to another authentication apparatus 11 that is not in the busy state at the current time. In the second example, the interested authentication apparatus 11 may acquire load amounts of the CPUs of the other authentication apparatuses 11 and adjust, based on the load amounts, ranges to be assigned.

In the second example, when a certain authentication apparatus 11 is installed on the opposite side of the interested authentication apparatus 11 that has received biological data (to be subjected to the authentication) with respect to an entrance door 14 for which the interested authentication apparatus 11 is installed, the interested authentication apparatus 11 may cause the certain authentication apparatus 11 to be included in authentication apparatuses that will execute the crosschecking process on classified ranges. In the second example, the assigning unit 47 may assign crosschecking ranges to authentication apparatuses 11 in the process-enabled state based on the number of the authentication apparatuses 11 in the process-enabled state and cause the authentication apparatuses 11 to execute the crosschecking process.

According to the embodiment, a time for authentication of biological information may be reduced. For example, in the embodiment, the crosschecking (1:N crosschecking) may be efficiently executed only using biological information without using keys to enter information other than the biological information, and the authentication process may be executed for a short time. According to the embodiment, the crosschecking process may be distributed to a plurality of authentication apparatuses and therefore appropriately executed even when the CPUs of the authentication apparatuses have low-level specifications. According to the embodiment, even when any of the plurality of authentication apparatuses fails, another authentication apparatus that is operable enables the authentication system to recover.

The authentication apparatuses according to the embodiment and the like may not be installed near the entrance doors to the predetermined area (region) such as a room and are applicable not only to the system for managing entries and leaving in and from the predetermined area but also to user authentication for which multiple automated teller machines (ATMs) are installed.

Although the embodiment is described above, the disclosure is not limited to the specific embodiment, and the embodiment may be variously modified and changed within the scope described in the claims. In addition, a part of or all the aforementioned examples of the embodiment may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An authentication system comprising:
   a plurality of authentication apparatuses, each of the plurality of authentication apparatuses including registered biological information of a set of users in a storage unit, the registered biological information of the set of users in the each of the plurality of authentication apparatuses being the same, wherein a first authentication apparatus of the plurality of authentication apparatuses includes;
   at least one processor configured to
   crosscheck, when user biological information to be subjected to authentication is input, the user biological information with a first part of the registered biological information,
   send, to a second authentication apparatus of the plurality of authentication apparatuses, a request to crosscheck the user biological information with a second part of the registered biological information, the second part being different than the first part, without sending, to a third authentication apparatus of the plurality of the authentication apparatuses, a request to crosscheck the user biological information with the second part, and
   receive, from the second authentication apparatus, a result of crosschecking the user biological information with the second part of the registered biological information by the second authentication apparatus in response to the requesting.

2. The authentication system according to claim 1, wherein each of the plurality of authentication apparatuses is installed near an entrance to a predetermined area and control entry and leaving in and from the predetermined area.

3. The authentication system according to claim 2, wherein one of the plurality of authentication apparatuses to which the user biological information to be subjected to the authentication is input unlocks a door to the predetermined area on the basis of a result of crosschecking the user biological information with the first part of the registered biological information and the second part of the registered biological information.

4. The authentication system according to claim 2, wherein the first authentication apparatus causes, based on positional information of the second authentication apparatus, a fourth authentication apparatus to be included in authentication apparatuses to be requested to execute crosschecking, while the fourth authentication apparatus is installed on the opposite side of the first authentication apparatus.

5. The authentication system according to claim 1, wherein when the second authentication apparatus is in a busy state, the first authentication apparatus selects a next candidate authentication apparatus from among the remaining other authentication apparatuses of the plurality of authentication apparatuses and requests the selected authentication apparatus to execute crosschecking.

6. The authentication system according to claim 1, wherein the first authentication apparatus provides a state acknowledgement request to each of the plurality of authentication apparatuses, other than the first authentication apparatus, identifies, based on a response result received from each of the plurality of authentication apparatuses, a fourth authentication apparatus to be requested to execute crosschecking, and
requests the identified fourth authentication apparatus to execute the crosschecking.

7. The authentication system according to claim 1, wherein the first authentication apparatus requests a fourth authentication apparatus selected based on usage frequency information of the second authentication apparatus to execute crosschecking.

8. The authentication system according to claim 7, wherein the usage frequency information is average numbers of times of the crosschecking executed by the second authentication apparatus in predetermined time zones including a time when the user biological information.

9. An authentication apparatus comprising:
a storage unit configured to store registered biological information of a set of users in a storage unit, the registered biological information also being stored in a plurality of other authentication apparatuses, the registered biological information of the set of users being stored in each of the plurality of authentication apparatuses being the same,
at least one processor configured to
  crosscheck, when user biological information to be subjected to authentication is input, the user biological information with a first part of the registered biological information,
  send, to a second authentication apparatus of the plurality of other authentication apparatuses, a request to crosscheck the user biological information with a second part of the registered biological information, the second part being different than the first part, without sending, to a third authentication apparatus of the plurality of other authentication apparatuses, a request to crosscheck the user biological information with the second part, and
  receive, from the second authentication apparatus, a result of crosschecking the user biological information with the second part of the registered biological information by the second authentication apparatus in response to the requesting.

10. An authentication method comprising:
causing an authentication apparatus to crosscheck, when user biological information to be subjected to authentication is input, the user biological information with a first part of registered biological information of a plurality of users being stored in a storage unit;
causing the authentication apparatus to assign a second part of the registered biological information, the second part being different than the first part, to a second authentication apparatus without assigning the second part to a third authentication apparatus, and to request the second authentication apparatus to crosscheck user biological information with the second part; and
causing the authentication apparatus to receive, from the second authentication apparatus, one or more results of crosschecking the user biological information with the second part of the registered biological information by the second authentication apparatus in response to the request for the crosschecking,
wherein the registered biological information of the plurality of users being stored in the storage unit of the authentication apparatus being the same as registered biological information stored in the second authentication apparatus.

* * * * *